US012625615B2

(12) United States Patent　　(10) Patent No.:　US 12,625,615 B2

Redaelli　　(45) Date of Patent:　May 12, 2026

(54) BOOT OPERATIONS AND LOGICAL BLOCK ADDRESSES

(71) Applicant: Micron Technology, Inc., Boise, ID (US)

(72) Inventor: Marco Redaelli, Munich (DE)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/788,044

(22) Filed: Jul. 29, 2024

(65) Prior Publication Data

US 2025/0278196 A1　　Sep. 4, 2025

Related U.S. Application Data

(60) Provisional application No. 63/559,485, filed on Feb. 29, 2024.

(51) Int. Cl.
G06F 3/06　　　(2006.01)
(52) U.S. Cl.
CPC .......... G06F 3/0613 (2013.01); G06F 3/0659 (2013.01); G06F 3/0673 (2013.01)
(58) Field of Classification Search
CPC ..... G06F 3/0613; G06F 3/0659; G06F 3/0673
See application file for complete search history.

(56) References Cited

U.S. PATENT DOCUMENTS

| | | | | |
|---|---|---|---|---|
| 6,347,372 | B1 * | 2/2002 | Takashima ............ | G06F 9/4405 |
| | | | | 709/222 |
| 2007/0150661 | A1 * | 6/2007 | Suda ....................... | G06F 9/441 |
| | | | | 711/137 |
| 2015/0012628 | A1 * | 1/2015 | Chatterjee ............... | H04L 67/34 |
| | | | | 709/222 |
| 2018/0307297 | A1 * | 10/2018 | Semeria ................ | G06F 1/3228 |
| 2019/0042781 | A1 * | 2/2019 | Lukacs ................... | G06F 21/56 |
| 2021/0311823 | A1 * | 10/2021 | Schat .................. | G06F 11/1068 |
| 2021/0373908 | A1 * | 12/2021 | Liang .................... | G06F 9/4401 |

* cited by examiner

*Primary Examiner* — Janice M. Girouard
(74) *Attorney, Agent, or Firm* — Holland & Hart LLP

(57) ABSTRACT

Methods, systems, and devices for boot operations and logical block addresses are described. A memory system may identify logical block addresses (LBAs) that are more frequently accessed during the boot phase relative to other LBAs. Such LBAs may be referred to herein as boot LBAs. For example, the memory system may maintain a counter for each LBA read during the boot phase, which may enable the memory system to track and record the frequency of each LBA accessed during the boot phase. Using the information gathered about the boot LBAs (e.g., the quantity of accesses of each boot LBA), the memory system may perform a defragmentation process, which may be triggered by a host system, to consolidate the boot LBAs within a threshold quantity of memory blocks. In some examples, defragmentation of the boot LBAs may also be based on a sequence of the boot LBAs.

22 Claims, 5 Drawing Sheets

Figure 5:
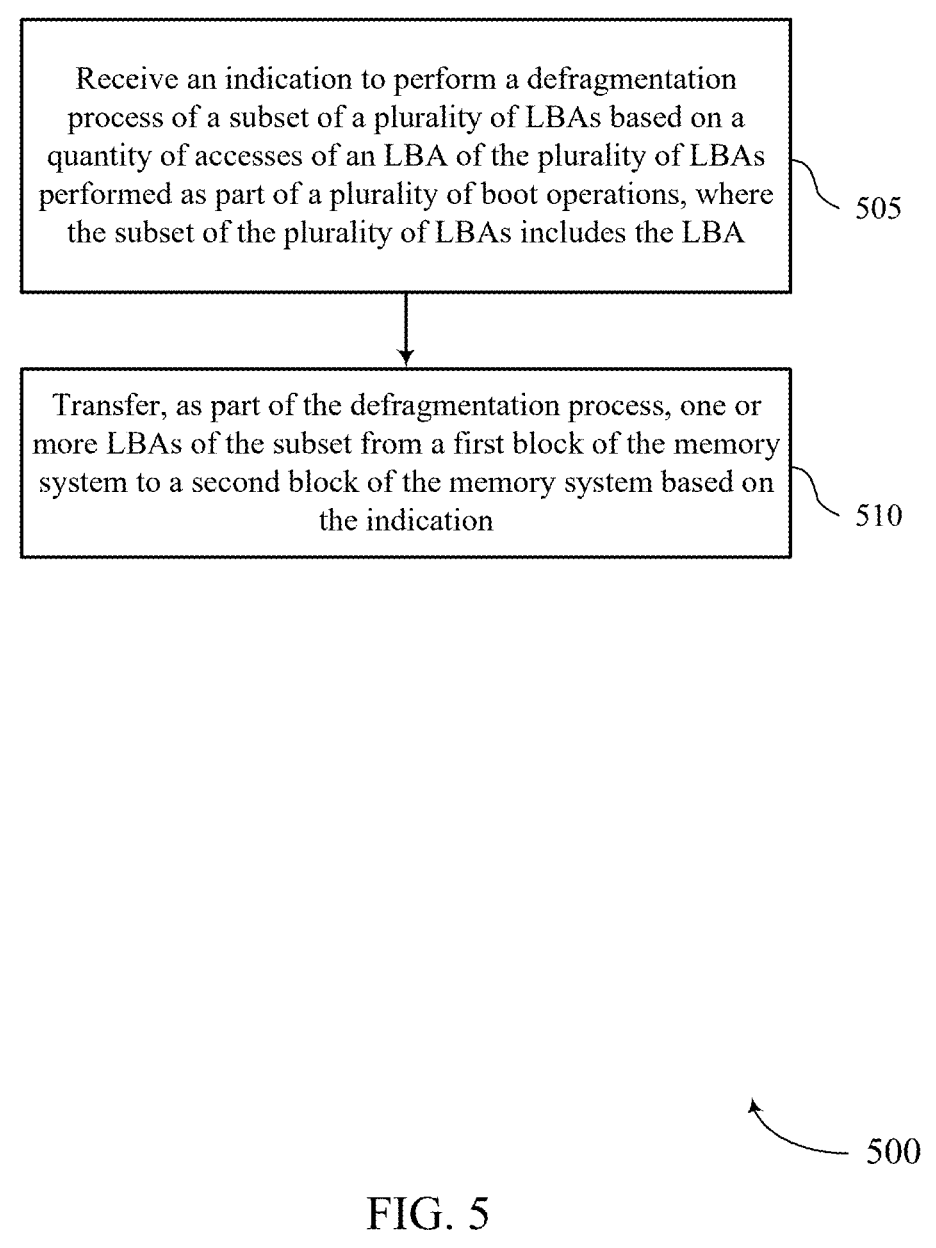

Receive an indication to perform a defragmentation process of a subset of a plurality of LBAs based on a quantity of accesses of an LBA of the plurality of LBAs performed as part of a plurality of boot operations, where the subset of the plurality of LBAs includes the LBA

505

Transfer, as part of the defragmentation process, one or more LBAs of the subset from a first block of the memory system to a second block of the memory system based on the indication

BOOT OPERATIONS AND LOGICAL BLOCK ADDRESSES

CROSS REFERENCE

The present Application for Patent claims priority to U.S. Patent Application No. 63/559,485 by Redaelli, entitled "BOOT OPERATIONS AND LOGICAL BLOCK ADDRESSES," filed Feb. 29, 2024, which is assigned to the assignee hereof, and which is expressly incorporated by reference in its entirety herein.

TECHNICAL FIELD

The following relates to one or more systems for memory, including boot operations and logical block addresses.

BACKGROUND

Memory devices are widely used to store information in devices such as computers, user devices, wireless communication devices, cameras, digital displays, and others. Information is stored by programming memory cells within a memory device to various states. For example, binary memory cells may be programmed to one of two supported states, often denoted by a logic 1 or a logic 0. In some examples, a single memory cell may support more than two states, any one of which may be stored. To access the stored information, the memory device may read (e.g., sense, detect, retrieve, determine) states from the memory cells. To store information, the memory device may write (e.g., program, set, assign) states to the memory cells.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, not- or (NOR) and not- and (NAND) memory devices, and others. Memory cells may be described in terms of volatile configurations or non-volatile configurations. Memory cells configured in a non-volatile configuration may maintain stored logic states for extended periods of time even in the absence of an external power source. Memory cells configured in a volatile configuration may lose stored states when disconnected from an external power source.

BRIEF DESCRIPTION OF THE DRAWINGS

FIG. 5 shows a flowchart illustrating a method or methods that support boot operations and logical block addresses in accordance with examples as disclosed herein.

DETAILED DESCRIPTION

Figure 1:
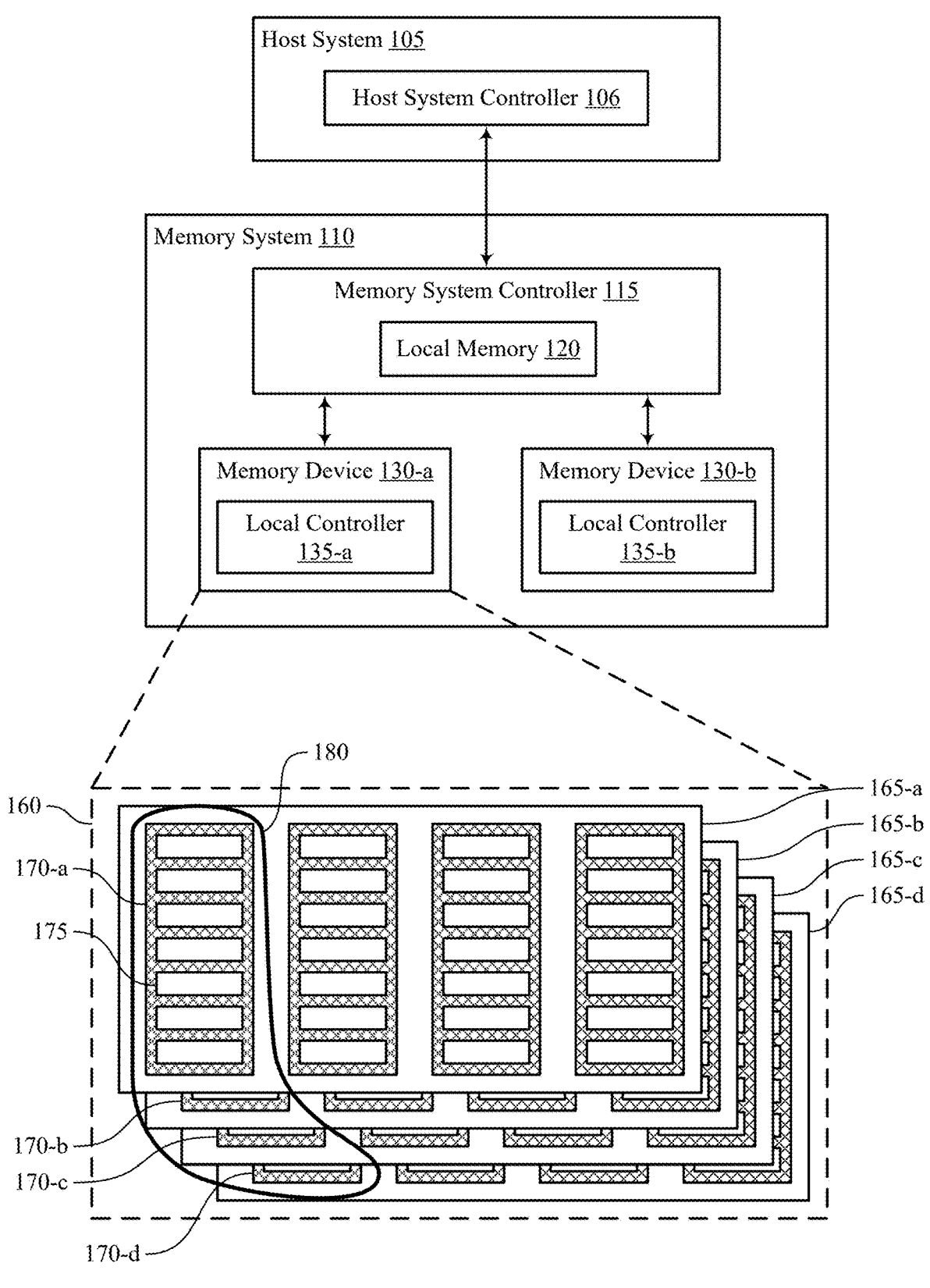
FIG. 1 shows an example of a system that supports boot operations and logical block addresses in accordance with examples as disclosed herein.

After a memory system (e.g., a solid state drive (SSD) powers on or resets, the memory system may perform a boot phase, or a boot operation, in which the memory system may perform various operations or procedures to achieve a fully operational state. In some examples, the boot phase takes an amount of time (e.g., two minutes) after power on or reset. The memory system may perform read operations of logical block addresses (LBAs) during the boot phase, and, in some cases, one or more sequences (e.g., logical sequences) of LBAs may be read from the system, which may contain boot-related data. However, LBAs that the memory system accesses during boot may be scattered, or fragmented, in memory (e.g., across multiple blocks), which may result in slow boot times and inefficient system startup (e.g., in systems that utilize SSDs).

To improve efficiency of system startup and reduce boot times, techniques described herein may provide for the memory system to learn (e.g., identify, store, track, and/or update) LBAs that are more frequently accessed during the boot phase relative to other LBAs (e.g., LBAs that satisfy an access frequency threshold). Such LBAs may be referred to herein as boot LBAs. A boot LBA may be defined as an LBA read within a specific time period when the system is implementing a boot-up procedure. The boot LBA recording time can be user configurable within the available memory footprint. In some examples, the memory system may maintain a counter for each LBA read during the boot phase (or maintain counters for each group of LBAs read during the boot phase), which may enable the memory system to track and record (e.g., store in memory) the frequency of each LBA accessed during the boot phase. Using the information (e.g., quantity of accesses) gathered about the boot LBAs, the memory system may perform a defragmentation process, which may be triggered by a host system, to consolidate the boot LBAs within a threshold quantity of memory blocks. By defragmenting (e.g., consolidating) the boot LBAs, the memory system may enable relatively faster retrieval of the boot LBAs during subsequent boot phases, or cycles. For example, the memory system may organize the boot LBAs in a contiguous manner (e.g., storing boot LBAs in contiguously indexed logical block addresses and/or contiguously indexed physical block addresses), which may reduce the seek time associated with accessing information during a system boot. By identifying, tracking, and organizing boot LBAs, the memory system may support reduced boot times, enhanced system responsiveness, improved user experience, and efficient resource utilization.

In addition to applicability in memory systems as described herein, techniques for boot operations and LBAs may be generally implemented to improve the performance of various electronic devices and systems (including artificial intelligence (AI) applications, augmented reality (AR) applications, virtual reality (VR) applications, and gaming). Some electronic device applications, including high-performance applications such as AI, AR, VR, and gaming, may be associated with relatively high processing requirements to satisfy user expectations. As such, increasing processing capabilities of the electronic devices by decreasing response times, improving power consumption, reducing complexity, increasing data throughput or access speeds, decreasing communication times, or increasing memory capacity or density, among other performance indicators, may improve user experience or appeal. Implementing the techniques described herein may improve the performance of electronic devices by improving memory access speeds during boot phases (e.g., power-on reset), which may decrease latency times, improve response times, or otherwise improve user experience, among other benefits.

Features of the disclosure are illustrated and described in the context of systems, devices, and circuits. Features of the disclosure are further illustrated and described in the context of flow diagrams, architectures, block diagrams, and flowcharts.

FIG. 1 shows an example of a system 100 that supports boot operations and logical block addresses in accordance with examples as disclosed herein. The system 100 includes a host system 105 coupled with a memory system 110. The system 100 may be included in a computing device such as a desktop computer, a laptop computer, a network server, a mobile device, a vehicle, an Internet of Things (IoT) enabled device, an embedded computer (e.g., one included in a vehicle, industrial equipment, or a networked commercial device), or any other computing device that includes memory and a processing device.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other devices.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR)

interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally, or alternatively, include static random access memory (SRAM) or other memory that may be used by the memory system controller 115 for internal storage or calculations, for example, related to the functions ascribed herein to the memory system controller 115. Additionally, or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally, or alternatively, rely on an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may, in some cases, be performed instead by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally, or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on the same die, within the same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-*a* may include a local controller 135-*a* and a memory device 130-*b* may include a local controller 135-*b*.

In some cases, a memory device 130 may be or include a NAND device (e.g., NAND flash device). A memory device 130 may be or include a die 160 (e.g., a memory die). For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally, or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170 and, in some cases, concurrent operations may be performed on different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-*a*, 170-*b*, 170-*c*, and 170-*d* that are within planes 165-*a*, 165-*b*, 165-*c*, and 165-*d*, respectively, and blocks 170-*a*, 170-*b*, 170-*c*, and 170-*d* may be collectively referred to as a virtual block 180. In some cases, a virtual block may include blocks 170 from different memory devices 130 (e.g., including blocks in one or more planes of memory device 130-*a* and memory device 130-*b*). In some cases, the blocks 170 within a virtual block may have the same block address within their respective planes 165 (e.g., block 170-*a* may be "block 0" of plane 165-*a*, block 170-*b* may be "block 0" of plane 165-*b*, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in the same page 175 may share (e.g., be coupled with) a common word line, and memory cells in the same string may share (e.g., be coupled with) a common digit line (which may alternatively be referred to as a bit line).

For some NAND architectures, memory cells may be read and programmed (e.g., written) at a first level of granularity (e.g., at a page level of granularity, or portion thereof) but may be erased at a second level of granularity (e.g., at a block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete and may update a logical-to-physical (L2P) mapping table to associate the logical address (e.g., LBA) for the data with the new, valid block 170 rather than the old, invalid block 170. In some cases, such copying and remapping may be performed instead of erasing and rewriting the entire old block 170 due to latency or wearout considerations, for example. In some cases, one or more copies of an L2P mapping table may be stored within the memory cells of the memory device 130 (e.g., within one or more blocks 170 or planes 165) for use (e.g., reference and updating) by the local controller 135 or memory system controller 115.

In some cases, L2P mapping tables may be maintained and data may be marked as valid or invalid at the page level of granularity, and a page 175 may contain valid data, invalid data, or no data. Invalid data may be data that is outdated, which may be due to a more recent or updated version of the data being stored in a different page 175 of the memory device 130. Invalid data may have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has never been written to or that has been erased.

The system 100 may include any quantity of non-transitory computer readable media that support boot operations and logical block addresses. For example, the host system 105 (e.g., a host system controller 106), the memory system 110 (e.g., a memory system controller 115), or a memory device 130 (e.g., a local controller 135) may include or otherwise may access one or more non-transitory computer readable media storing instructions (e.g., firmware, logic, code) for performing the functions ascribed herein to the host system 105, the memory system 110, or a memory device 130. For example, such instructions, if executed by the host system 105 (e.g., by a host system controller 106), by the memory system 110 (e.g., by a memory system controller 115), or by a memory device 130 (e.g., by a local controller 135), may cause the host system 105, the memory system 110, or the memory device 130 to perform associated functions as described herein.

Further, although non-limiting examples of the system 100 herein are generally described in terms of applicability to memory systems, memory sub-systems, memory devices, or a combination thereof, examples of the system 100 are not so limited. For example, aspects of the present disclosure may be applied as well to any computing system, computing sub-system, processing system, processing sub-system, component, device, structure, or other types of systems or sub-systems used for applications such as data collecting, data processing, data storage, networking, communication, power, artificial intelligence, system-on-a-chip, control, telemetry, sensing and monitoring, digital entertainment, or any combination thereof.

After the memory system 110 (e.g., a solid-state drive (SSD) powers on or resets, the memory system may perform a boot phase, or a boot operation, in which the memory system may perform various operations or procedures to achieve a fully operational state. In some examples, the boot phase may be defined by a threshold amount of time (e.g., two minutes) after power on or reset. The memory system 110 may perform read operations of logical block addresses (LBAs) during the boot phase, and, in some cases, one or more sequences (e.g., logical sequences) of LBAs may be read from the system, which may contain boot-related data. However, LBAs that the memory system accesses during boot may be scattered, or fragmented, in memory (e.g., across multiple blocks 170), which may result in slow boot times and inefficient system startup (e.g., in systems that utilize SSDs).

To improve efficiency of system startup and reduce boot times, techniques described herein may provide for the memory system 110 to learn (e.g., identify, store, track, and/or update) LBAs that are more frequently accessed during the boot phase relative to other LBAs (e.g., LBAs that satisfy an access frequency threshold). Such LBAs may be referred to herein as boot LBAs. For example, the memory system may maintain a counter for each LBA read during the boot phase, which may enable the memory system 110 to track and record (e.g., store in memory) the frequency of each LBA accessed during the boot phase. Using the information (e.g., quantity of accesses) gathered about the boot LBAs, the memory system 110 may perform a defragmentation process, which may be triggered by a host system 105, to consolidate the boot LBAs within a threshold quantity of memory blocks 170. By defragmenting (e.g., consolidating) the boot LBAs, the memory system may enable relatively faster retrieval of the boot LBAs during subsequent boot phases, or cycles. For example, the memory system 110 may organize the Boot LBAs in a contiguous manner (e.g., according to a logical sequence of the boot LBAs, within a threshold quantity of blocks 170) which may reduce the seek time associated with accessing information during a system boot. By identifying, tracking, and organizing boot LBAs, the memory system may support reduced boot times, enhanced system responsiveness, improved user experience, and efficient resource utilization.

Figure 2:
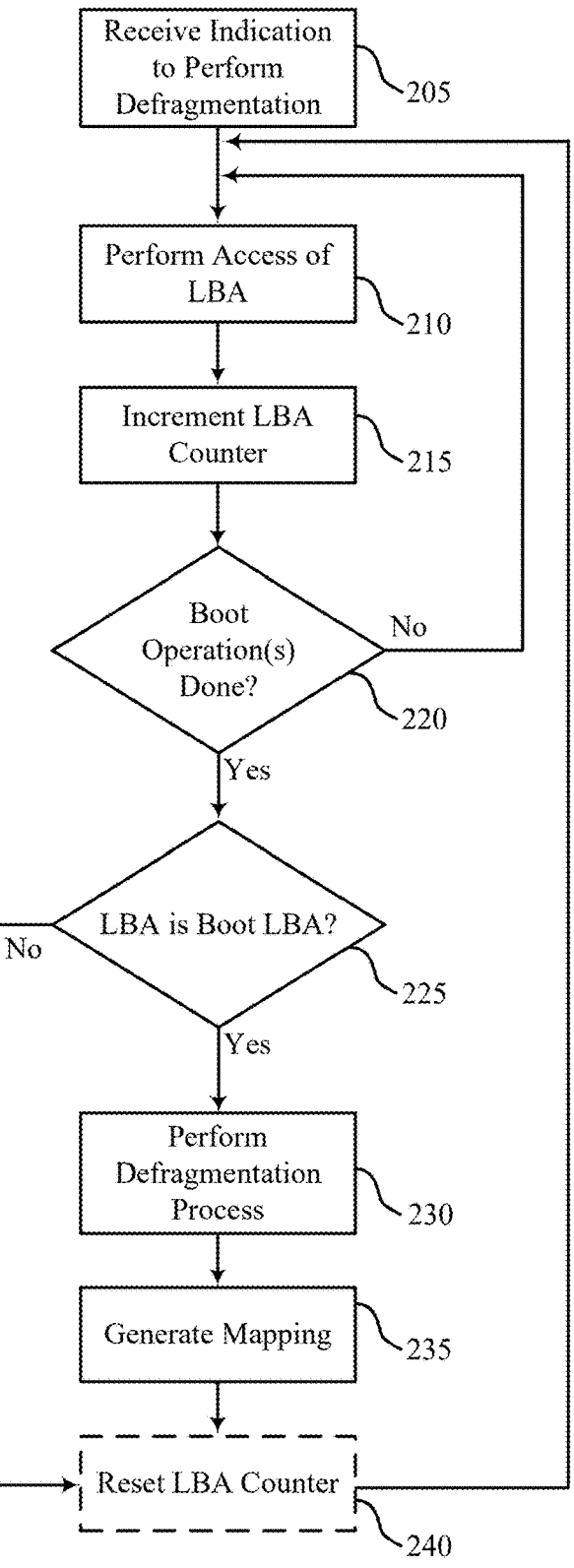
FIG. 2 shows an example of a flow diagram that supports boot operations and logical block addresses in accordance with examples as disclosed herein.

FIG. 2 shows an example of a flow diagram 200 that supports boot operations and logical block addresses in accordance with examples as disclosed herein. The flow diagram 200 may implement or may be implemented by aspects of the system 100. For example, the flow diagram 200 may be implemented by a memory system 110, and one or more steps performed by the memory system 110 in the flow diagram 200 may be implemented in instructions or firmware stored on memory of the memory system 110 (e.g., a memory device 130) and may be executed by a memory system controller 115 (and/or a local controller 135).

In the following description of the flow diagram 200, the operations may be performed in a different order than the order shown, or other operations may be added or removed from the flow diagram 200. For example, some operations may also be left out of the flow diagram 200, may be performed in different orders or at different times, or other operations may be added to the flow diagram 200.

At 205, a memory system (e.g., a memory system controller 115) may receive an indication to perform a defragmentation process of a subset of a set of multiple LBAs based on a quantity of accesses of an LBA of the set of multiple LBAs performed as part of multiple boot operations. The subset of LBAs to be defragmented may include the LBA (e.g., the LBA to which the quantity of accesses corresponds), and in some cases may include other boot LBAs in addition to the LBA. In some examples, the memory system may receive the indication to perform the defragmentation process from a host system. The defragmentation process may receive the indication to perform the defragmentation process at certain times, such as during one or more system idle periods or during one or more charging periods of the memory system. By leveraging low activity intervals (e.g., idle periods, charging periods), the memory system may prevent defragmentation operations from interfering with normal system operations. By strategic scheduling of the defragmentation process (e.g., by the host system controller 106), the memory system (e.g., the memory system controller 115) may support increased boot performance with little or no impact to user experience. In some examples, the indication from the host system to perform the defragmentation process may indicate that the defragmentation process is an additional capability, or an additional enhancement, within an overall defragmentation process (e.g., the defragmentation process may be a portion of the overall defragmentation process), and the host system may indicate for the memory system to transfer other LBAs, in addition to the one or more LBAs, as part of the overall defragmentation process. In other words, the defragmentation process may be an add-on feature of the overall defragmentation process, which may be an existing defragmentation process, or may otherwise be built on top of or added to the overall defragmentation process.

At 210, the memory system may, as part of a boot operation of the multiple boot operations, perform an access (e.g., a read operation) of the LBA. A boot operation (e.g., a boot phase) may be associated with, or may occur during, an initial two minutes after system power-on or reset of the memory system. At 215, the memory system may increment a counter of the LBA in response to (e.g., based on) performing the access of the LBA. In some examples, the memory system may store, or update, counters for multiple LBAs that are accessed, or read, as part of (e.g., during) the multiple boot operations. For example, any LBA that is accessed during the multiple boot operations may be assigned a counter, and the quantity of accesses of the LBA may be tracked or monitored (e.g., over multiple boot operations, over a single boot operation) using the counter.

At 220, the memory system may determine whether one or more boot operations (e.g., boot phases) are done, for example, to determine whether the memory system continues tracking of the counter, or quantity of accesses of the LBA. The one or more boot operations for which the memory system tracks a quantity of accesses for the LBA (e.g., or for multiple LBAs, or each LBA accessed during boot) may be referred to as an assessment period. As part of the assessment period, the memory system may perform the one or more boot operations, and may maintain a counter for each LBA that is accessed by the memory system during boot to determine a quantity of accesses for each of multiple LBAs. In some examples, the assessment period may be a single boot operation or may be at least a threshold quantity of boot operations.

At 225, the memory system may determine whether the LBA associated with the quantity of accesses of the LBA is a boot LBA. The memory system may determine that the LBA is a boot LBA based on the quantity of accesses of the LBA satisfying a threshold quantity. If the LBA is a boot LBA, the memory system may label, or otherwise categorize, the LBA as a boot LBA.

At 230, the memory system may perform a defragmentation process of a subset of LBAs of a set of multiple LBAs, and the subset of LBAs may include at least the LBA. As part of the defragmentation process, the memory system may transfer one or more LBAs of the subset of LBAs from one or more first blocks of the memory system to one or more second blocks of the memory system based on the indication (e.g., from the host device) to perform the defragmentation process. Performing the defragmentation process may be based on determining that the LBA is a boot LBA, the quantity of accesses of the LBA, or both.

Additionally, or alternatively, the defragmentation process may be based on a priority (e.g., an assigned priority) of LBAs of the subset of LBAs for which the defragmentation process applies. For example, the memory system may assign a priority to an LBA of the subset (e.g., to each LBA of the subset) based on the quantity of accesses of the LBA, a sequential order of the LBA relative to other LBAs (e.g., other LBAs of the subset), or both. Transferring the one or more LBAs of the subset may be based on the priority. For example, the memory system may organize LBAs based on a frequency of access (e.g., quantity of accesses) of one or more LBAs of the subset or based on the sequential order of one or more LBAs of the subset. By prioritizing LBAs based on either or both of their read frequency or their sequential order, the defragmentation process may determine placement of data in the memory system in accordance with utilization of one or more access operation mechanisms or procedures (e.g., a snap read feature, as described in greater detail with reference to FIG. 3).

At 235, the memory system may generate a mapping between a logical address of the LBA and a physical address of the LBA based on transferring the one or more LBAs of the subset of LBAs. To facilitate efficient access to Boot LBAs during boot, a dedicated table (e.g., a dedicated L2P table) may be created to map the logical addresses of the LBAs to their corresponding physical locations in memory (e.g., NAND flash memory). The mapping table may be optimized for rapid loading at system boot (e.g., at each subsequent boot operation), which may enable the memory system (e.g., a memory system controller 115, an SSD controller) to quickly determine a physical location of each boot LBA. By enabling swift access to boot LBAs, the memory system may support reduced boot times, reduced latency, and enhanced system responsiveness. In some examples, the memory system may store the mapping (e.g., the mapping table) in memory that may be accessed relatively quickly during a boot operation of the memory system.

At 240, the memory system may receive an indication to reset the counter associated with the LBA. The memory system may receive the indication to reset the counter from a host system (e.g., a host system 105). The memory system may set the counter to a first value (e.g., 0) in response to (e.g., based on) the memory system receiving the indication to reset the counter. In some examples, the indication to reset the counter may apply to multiple counters each corresponding to a respective LBA (e.g., boot LBA), and the memory system may reset the multiple counters (e.g., to 0). In some examples, in response to (e.g., based on) resetting the counter of the LBA, the memory system may return to 210 and perform a recount (e.g., an update) of the quantity of accesses of the LBA. That is, the memory system may determine, over a second set of multiple boot operations of the memory system, a second quantity (e.g., an updated quantity) of accesses of the LBA as part of (e.g., that occur during) the second set of multiple boot operations. In some examples, the memory system may perform a reset of the counter at a periodicity or after a threshold time has elapsed.

Figure 3:
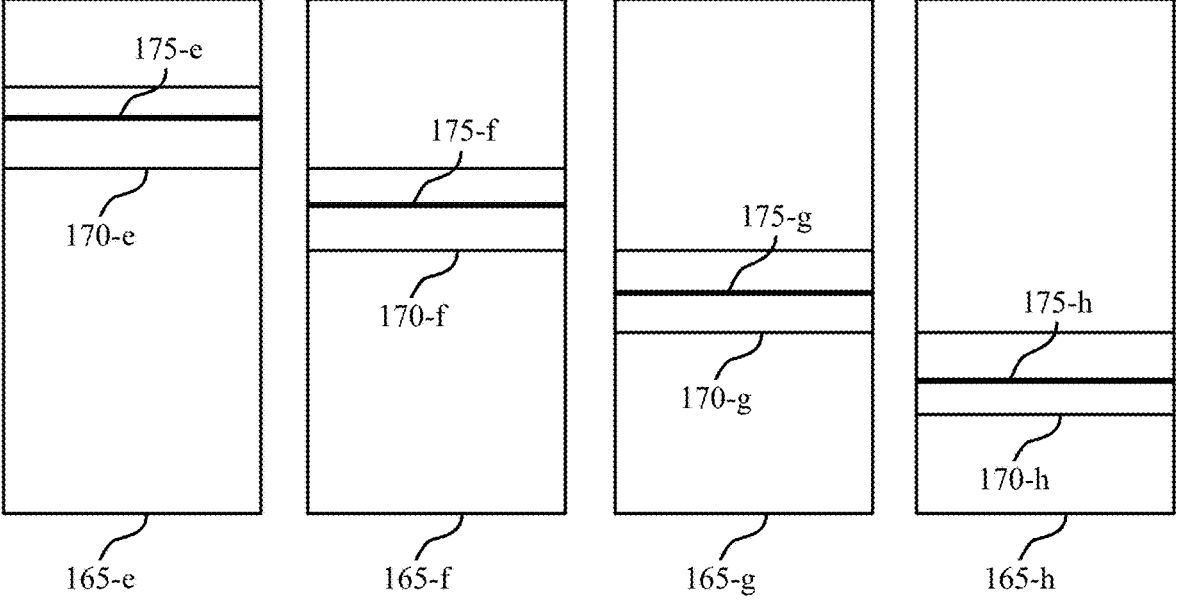
FIG. 3 shows an example of an architecture that supports boot operations and logical block addresses in accordance with examples as disclosed herein.

FIG. 3 shows an example of an architecture 300 that supports boot operations and logical block addresses in accordance with examples as disclosed herein. The architecture 300 may implement or may be implemented by aspects of the system 100. For example, the architecture 300 may include a plane 165-c, a plane 165-f, a plane 165-g, and a plane 165-h, which may be examples of a plane 165 as described with reference to FIG. 1. The architecture 300 may additionally include a block 170-e, a block 170-f, a block 170-g, and a block 170-h, which may be examples of a block 170 as described with reference to FIG. 1. The architecture 300 may additionally include a page 175-e, a page 175-f, a page 175-g, and a page 175-h, which may be examples of a page 175 as described with reference to FIG. 1.

In some examples, a memory system may perform a snap read of a set of multiple pages 175. By performing the snap read, the memory system may access, or read, pages that are of different planes 165, of different blocks 170, or both, and that are located in pages that are different across the planes 165, the blocks 170, or both. For example, using a single snap read operation, the memory system may read data from the page 175-e, which may be stored in a block 170-e of a plane 165-e, a page 175-f, which may be stored in a block 170-f of a plane 165-f, a page 175-g, which may be stored in a block 170-g of a plane 165-g, and a page 175-h, which may be stored in a block 170-h of a plane 165-h. A snap ready operation provides a faster read operation than a page read operation to further improve NAND flash device output performance. These two read operations have different target purposes in terms of random read performance: a page read operation may be designed for larger workloads (>8 KB), while a snap read operation may be designed for smaller workloads (<=8 KB). While a page read operation can provide data for the entire page length of a NAND device, a snap read operation is limited to 8 KB of data access at a time. The benefit of targeting a smaller workload is faster read time, which is why a snap read operation may be a better fit for applications using small workloads that request better random read performance.

In some examples, by performing a defragmentation process of LBAs accessed during boot (e.g., defragmentation of boot LBAs), as described in greater detail with reference to FIG. 2, the memory system may move, or transfer, LBAs to utilize the snap read feature of the memory system. For example, an LBA may be identified by the memory system as being a high priority LBA (e.g., or a boot LBA), for example, because the LBA is associated with a relatively high frequency of access or quantity of accesses, and the memory system may store the LBA in the page 175-c. The memory system may identify other LBAs that are associated with the LBA (e.g., sequentially-indexed with the LBA), and may store the other identified LBAs in the page 175-f, the page 175-g, and/or the page 175-h, such that a single snap read by the memory system may read the LBA stored in the page 175-e in addition to the other LBAs that are associated with, or sequentially-indexed with, the LBA. In some other examples, the memory system may store a first relatively high priority LBA (e.g., a first boot LBA) in the page 175-e and a second relatively high priority LBA (e.g., a second boot LBA) in the page 175-f based on quantities of access for the two LBAs such that the memory system can access both of the high priority LBAs (e.g., boot LBAs) in a single snap read operation. Such utilization of snap read by the memory system to read boot LBAs may support reduced boot times or increased system responsiveness, leading to improved user experience.

Figure 4:
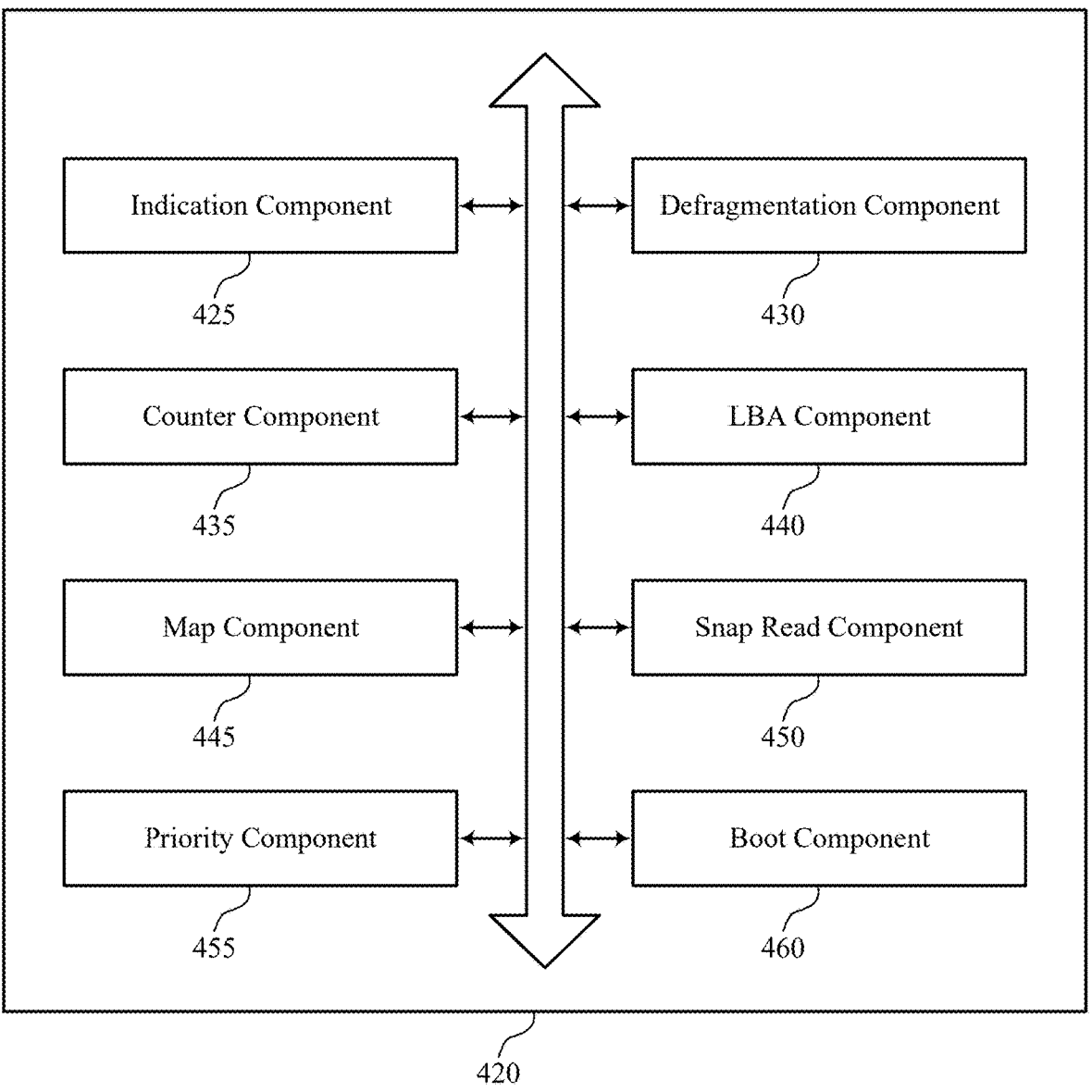
FIG. 4 shows a block diagram of a memory system that supports boot operations and logical block addresses in accordance with examples as disclosed herein.

FIG. 4 shows a block diagram 400 of a memory system 420 that supports boot operations and logical block addresses in accordance with examples as disclosed herein. The memory system 420 may be an example of aspects of a memory system as described with reference to FIGS. 1 through 3. The memory system 420, or various components thereof, may be an example of means for performing various aspects of boot operations and logical block addresses as described herein. For example, the memory system 420 may include an indication component 425, a defragmentation component 430, a counter component 435, an LBA component 440, a map component 445, a snap read component 450, a priority component 455, a boot component 460, or any combination thereof. Each of these components, or components of subcomponents thereof (e.g., one or more processors, one or more memories), may communicate, directly or indirectly, with one another (e.g., via one or more buses).

The indication component 425 may be configured as or otherwise support a means for receiving an indication to perform a defragmentation process of a subset of a plurality of LBAs based on a quantity of accesses of an LBA of the plurality of LBAs performed as part of a plurality of boot operations, where the subset of the plurality of LBAs includes the LBA. The defragmentation component 430 may be configured as or otherwise support a means for transferring, as part of the defragmentation process, one or more LBAs of the subset from one or more first blocks of the memory system to one or more second blocks of the memory system based on the indication.

In some examples, the counter component 435 may be configured as or otherwise support a means for determining, over the plurality of boot operations of the memory system, that the quantity of accesses of the LBA satisfies a threshold, where receiving the indication is based on the quantity of accesses satisfying the threshold.

In some examples, the one or more second blocks of the memory system include the subset of the plurality of LBAs based at least in part on the defragmentation process. In some examples, the one or more second blocks of the memory system satisfy a threshold quantity of blocks.

In some examples, the LBA component 440 may be configured as or otherwise support a means for accessing the LBA as part of a boot operation of the plurality of boot operations. In some examples, the counter component 435 may be configured as or otherwise support a means for incrementing a counter associated with the LBA based on accessing the LBA, where the quantity of accesses of the LBA is based on the counter.

In some examples, the boot component 460 may be configured as or otherwise support a means for initiating a learning procedure associated with determining, over the plurality of boot operations, which of the plurality of LBAs satisfy a threshold quantity of accesses. In some examples, the counter component 435 may be configured as or otherwise support a means for maintaining a plurality of counters, including the counter, each counter corresponding to a respective quantity of accesses of a respective LBA of the plurality of LBAs, where incrementing the counter is based at least in part on maintaining the plurality of counters.

In some examples, the boot component 460 may be configured as or otherwise support a means for determining to stop the learning procedure based at least in part on a completion of the plurality of boot operations. In some examples, the defragmentation component 430 may be configured as or otherwise support a means for performing the defragmentation process based at least in part on the determination to stop the learning procedure.

In some examples, the indication component 425 may be configured as or otherwise support a means for receiving a second indication to reset the counter associated with the LBA. In some examples, the counter component 435 may be configured as or otherwise support a means for setting the counter to a first value based on receiving the second indication.

In some examples, the counter component 435 may be configured as or otherwise support a means for determining, over a second plurality of boot operations of the memory system, a second quantity of accesses of the LBA as part of the second plurality of boot operations based on setting the counter to the first value.

In some examples, the map component 445 may be configured as or otherwise support a means for generating a mapping between a logical address of the LBA and a physical address of the LBA based on transferring the one or more LBAs of the subset. In some examples, the map component 445 may be configured as or otherwise support a means for loading the mapping as part of a boot operation of the plurality of boot operations. In some examples, the LBA component 440 may be configured as or otherwise support a means for determining the physical address of the LBA based on the mapping.

In some examples, the snap read component 450 may be configured as or otherwise support a means for performing a snap read of a set of LBAs including the LBA of a first plane of the memory system and one or more other LBAs of one or more other planes of the memory system, where a first placement of the LBA in the first plane and a second placement of the one or more other LBAs in the one or more other planes is based on transferring the one or more LBAs of the subset.

In some examples, the priority component 455 may be configured as or otherwise support a means for assigning a priority to the LBA based on the quantity of accesses of the LBA, a sequential order of the LBA relative to other LBAs of the plurality of LBAs, or both, where transferring the one or more LBAs of the subset is based on the priority.

In some examples, the boot component 460 may be configured as or otherwise support a means for performing, as part of a boot operation of the plurality of boot operations, a first access of the second block including the LBA and a second access of a third block that is sequentially-indexed with the second block based on transferring the one or more LBAs of the subset.

In some examples, to support receiving the indication to perform the defragmentation process, the indication component 425 may be configured as or otherwise support a means for receiving the indication to perform the defragmentation process during an idle period or a charging period of the memory system.

In some examples, the described functionality of the memory system 420, or various components thereof, may be supported by or may refer to at least a portion of at least one processor, where such at least one processor may include one or more processing elements (e.g., a controller, a microprocessor, a microcontroller, a digital signal processor, a state machine, discrete gate logic, discrete transistor logic, discrete hardware components, or any combination of one or more of such elements). In some examples, the described functionality of the memory system 420, or various components thereof, may be implemented at least in part by instructions (e.g., stored in memory, non-transitory computer-readable medium) executable by such at least one processor.

FIG. 5 shows a flowchart illustrating a method 500 that supports boot operations and logical block addresses in accordance with examples as disclosed herein. The operations of method 500 may be implemented by a memory system or its components as described herein. For example, the operations of method 500 may be performed by a memory system as described with reference to FIGS. 1 through 4. In some examples, a memory system may execute a set of instructions to control the functional elements of the device to perform the described functions. Additionally, or alternatively, the memory system may perform aspects of the described functions using special-purpose hardware.

At 505, the method may include receiving an indication to perform a defragmentation process of a subset of a plurality of LBAs (e.g., stored in one or more memory devices 130 of a memory system 110) based on a quantity of accesses of an LBA of the plurality of LBAs performed as part of a plurality of boot operations, where the subset of the plurality of LBAs includes the LBA—e.g., as described herein, including with reference to the operations described at 205 of FIG. 2. In some examples, aspects of the operations of 505 may be performed by an indication component 425 as described with reference to FIG. 4.

At 510, the method may include transferring, as part of the defragmentation process, one or more LBAs of the subset from a first block (e.g., a block 170-*a*) of the memory system (e.g., the memory system 110) to a second block (e.g., a block 170-*b*) of the memory system based on the indication—e.g., as described herein, including with reference to the operations described at 230 of FIG. 2. In some examples, aspects of the operations of 510 may be performed by a defragmentation component 430 as described with reference to FIG. 4.

In some examples, an apparatus as described herein may perform a method or methods, such as the method 500. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for receiving an indication to perform a defragmentation process of a subset of a plurality of logical block addresses (LBAs) based at least in part on a quantity of accesses of an LBA of the plurality of LBAs performed as part of a plurality of boot operations, where the subset of the plurality of LBAs includes the LBA and transferring, as part of the defragmentation process, one or more LBAs of the subset from a first block of the memory system to a second block of the memory system based on the indication.

Aspect 2: The method, apparatus, or non-transitory computer-readable medium of aspect 1, further including operations, features, circuitry, logic, means, or instructions, or any combination thereof for determining, over the plurality of boot operations of the memory system, that the quantity of accesses of the LBA satisfies a threshold, where receiving the indication is based on the quantity of accesses satisfying the threshold.

Aspect 3: The method, apparatus, or non-transitory computer-readable medium of any of aspects 1 through 2, where the one or more second blocks of the memory system include the subset of the plurality of LBAs based at least in part on the defragmentation process and the one or more second blocks of the memory system satisfy a threshold quantity of blocks.

Aspect 4: The method, apparatus, or non-transitory computer-readable medium of any of aspects 1 through 3, further including operations, features, circuitry, logic, means, or instructions, or any combination thereof for accessing the LBA as part of a boot operation of the plurality of boot operations and incrementing a counter associated with the LBA based on accessing the LBA, where the quantity of accesses of the LBA is based on the counter.

Aspect 5: The method, apparatus, or non-transitory computer-readable medium of aspect 4, further including operations, features, circuitry, logic, means, or instructions, or any combination thereof for initiating a learning procedure associated with determining, over the plurality of boot operations, which of the plurality of LBAs satisfy a threshold quantity of accesses and maintaining a plurality of counters, including the counter, each counter corresponding to a respective quantity of accesses of a respective LBA of the plurality of LBAs, where incrementing the counter is based at least in part on maintaining the plurality of counters.

Aspect 6: The method, apparatus, or non-transitory computer-readable medium of aspect 5, further including operations, features, circuitry, logic, means, or instructions, or any combination thereof for determining to stop the learning procedure based at least in part on a completion of the plurality of boot operations and performing the defragmentation process based at least in part on the determination to stop the learning procedure.

Aspect 7: The method, apparatus, or non-transitory computer-readable medium of any of aspects 4 through 6, further including operations, features, circuitry, logic, means, or instructions, or any combination thereof for receiving a second indication to reset the counter associated with the LBA and setting the counter to a first value based on receiving the second indication.

Aspect 8: The method, apparatus, or non-transitory computer-readable medium of aspect 7, further including operations, features, circuitry, logic, means, or instructions, or any combination thereof for determining, over a second plurality of boot operations of the memory system, a second quantity of accesses of the LBA as part of the second plurality of boot operations based on setting the counter to the first value.

Aspect 9: The method, apparatus, or non-transitory computer-readable medium of any of aspects 1 through 8, further including operations, features, circuitry, logic, means, or instructions, or any combination thereof for generating a mapping between a logical address of the LBA and a physical address of the LBA based on transferring the one or more LBAs of the subset; loading the mapping as part of a boot operation of the plurality of boot operations; and determining the physical address of the LBA based on the mapping.

Aspect 10: The method, apparatus, or non-transitory computer-readable medium of any of aspects 1 through 9, further including operations, features, circuitry, logic, means, or instructions, or any combination thereof for performing a snap read of a set of LBAs including the LBA of a first plane of the memory system and one or more other LBAs of one or more other planes of the memory system, where a first placement of the LBA in the first plane and a second placement of the one or more other LBAs in the one or more other planes is based on transferring the one or more LBAs of the subset.

Aspect 11: The method, apparatus, or non-transitory computer-readable medium of any of aspects 1 through 10, further including operations, features, circuitry, logic, means, or instructions, or any combination thereof for assigning a priority to the LBA based on the quantity of accesses of the LBA, a sequential order of the LBA relative to other LBAs of the plurality of LBAs, or both, where transferring the one or more LBAs of the subset is based on the priority.

Aspect 12: The method, apparatus, or non-transitory computer-readable medium of any of aspects 1 through 11, further including operations, features, circuitry, logic, means, or instructions, or any combination thereof for performing, as part of a boot operation of the plurality of boot operations, a first access of the second block including the LBA and a second access of a third block that is sequentially-indexed with the second block based on transferring the one or more LBAs of the subset.

Aspect 13: The method, apparatus, or non-transitory computer-readable medium of any of aspects 1 through 12, where receiving the indication to perform the defragmentation process includes operations, features, circuitry, logic, means, or instructions, or any combination thereof for receiving the indication to perform the defragmentation process during an idle period or a charging period of the memory system.

It should be noted that the described techniques include possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, or symbols of signaling that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" (e.g., "electrically coupling") may refer to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and a second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and a second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally, or alternatively (e.g., in an alternative example), be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorus, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processing system (e.g., one or more processors, one or more controllers, control circuitry, processing circuitry, logic circuitry), firmware, or any combination thereof. If implemented in software executed by a processing system, the functions may be stored on or transmitted over as one or more instructions (e.g., code) on a computer-readable medium. Due to the nature of software, functions described herein can be implemented using software executed by a processing system, hardware, firmware, hardwiring, or combinations of any of these. Features implementing functions may be physically located at various positions, including being distributed such that portions of functions are implemented at different physical locations.

Illustrative blocks and modules described herein may be implemented or performed with one or more processors, such as a DSP, an ASIC, an FPGA, discrete gate logic, discrete transistor logic, discrete hardware components, other programmable logic device, or any combination thereof designed to perform the functions described herein. A processor may be an example of a microprocessor, a controller, a microcontroller, a state machine, or other types of processors. A processor may also be implemented as at least one of one or more computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of these are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A memory system, comprising:
one or more memory devices; and
processing circuitry coupled with the one or more memory devices and configured to cause the memory system to:
access a logical block address (LBA) of a plurality of LBAs as part of a boot operation of a plurality of boot operations;
increment a counter associated with the LBA based on accessing the LBA, wherein a quantity of accesses of the LBA is based on the counter;
receive an indication to perform a defragmentation process of a subset of the plurality of LBAs based on the quantity of accesses performed as part of the plurality of boot operations, wherein the subset of the plurality of LBAs comprises the LBA; and
transfer, as part of the defragmentation process, one or more LBAs of the subset from one or more first blocks of the memory system to one or more second blocks of the memory system based on the indication.

2. The memory system of claim 1, wherein the processing circuitry is further configured to cause the memory system to:
determine, over the plurality of boot operations of the memory system, that the quantity of accesses of the LBA satisfies a threshold, wherein receiving the indication is based on the quantity of accesses satisfying the threshold.

3. The memory system of claim 1, wherein the one or more second blocks of the memory system comprise the subset of the plurality of LBAs based on the defragmentation process, and wherein the one or more second blocks of the memory system satisfy a threshold quantity of blocks.

4. The memory system of claim 1, wherein the processing circuitry is further configured to cause the memory system to:
initiate a learning procedure associated with determining, over the plurality of boot operations, which of the plurality of LBAs satisfy a threshold quantity of accesses; and
maintain a plurality of counters, including the counter, each counter corresponding to a respective quantity of accesses of a respective LBA of the plurality of LBAs, wherein incrementing the counter is based on maintaining the plurality of counters.

5. The memory system of claim 4, wherein the processing circuitry is further configured to cause the memory system to:

determine to stop the learning procedure based on a completion of the plurality of boot operations; and perform the defragmentation process based on the determination to stop the learning procedure.

6. The memory system of claim 1, wherein the processing circuitry is further configured to cause the memory system to:

receive a second indication to reset the counter associated with the LBA; and set the counter to a first value based on receiving the second indication.

7. The memory system of claim 6, wherein the processing circuitry is further configured to cause the memory system to:

determine, over a second plurality of boot operations of the memory system, a second quantity of accesses of the LBA as part of the second plurality of boot operations based on setting the counter to the first value.

8. The memory system of claim 1, wherein the processing circuitry is further configured to cause the memory system to:

generate a mapping between a logical address of the LBA and a physical address of the LBA based on transferring the one or more LBAs of the subset;

load the mapping as part of the boot operation of the plurality of boot operations; and determine the physical address of the LBA based on the mapping.

9. The memory system of claim 1, wherein the processing circuitry is further configured to cause the memory system to:

perform a snap read of a set of LBAs comprising the LBA of a first plane of the memory system and one or more other LBAs of one or more other planes of the memory system, wherein a first placement of the LBA in the first plane and a second placement of the one or more other LBAs in the one or more other planes is based on transferring the one or more LBAs of the subset.

10. The memory system of claim 1, wherein the processing circuitry is further configured to cause the memory system to:

assign a priority to the LBA based on the quantity of accesses of the LBA, a sequential order of the LBA relative to other LBAs of the plurality of LBAs, or both, wherein transferring the one or more LBAs of the subset is based on the priority.

11. The memory system of claim 1, wherein the processing circuitry is further configured to cause the memory system to:

perform, as part of the boot operation of the plurality of boot operations, a first access of the one or more second blocks comprising the LBA and a second access of a third block that is sequentially-indexed with the one or more second blocks based on transferring the one or more LBAs of the subset.

12. The memory system of claim 1, wherein receiving the indication to perform the defragmentation process comprises the processing circuitry configured to cause the memory system to:

receive the indication to perform the defragmentation process during an idle period or a charging period of the memory system.

13. A method by a memory system, comprising:

accessing a logical block address (LBA) of a plurality of LBAs as part of a boot operation of a plurality of boot operations;

incrementing a counter associated with the LBA based on accessing the LBA, wherein a quantity of accesses of the LBA is based on the counter;

receiving an indication to perform a defragmentation process of a subset of the plurality of LBAs based on the quantity of accesses performed as part of the plurality of boot operations, wherein the subset of the plurality of LBAs comprises the LBA; and transferring, as part of the defragmentation process, one or more LBAs of the subset from one or more first blocks of the memory system to one or more second blocks of the memory system based on the indication.

14. The method of claim 13, further comprising:

determining, over the plurality of boot operations of the memory system, that the quantity of accesses of the LBA satisfies a threshold, wherein receiving the indication is based on the quantity of accesses satisfying the threshold.

15. The method of claim 13, further comprising:

receiving a second indication to reset the counter associated with the LBA; and setting the counter to a first value based on receiving the second indication.

16. The method of claim 15, further comprising:

determining, over a second plurality of boot operations of the memory system, a second quantity of accesses of the LBA as part of the second plurality of boot operations based on setting the counter to the first value.

17. The method of claim 13, further comprising:

generating a mapping between a logical address of the LBA and a physical address of the LBA based on transferring the one or more LBAs of the subset;

loading the mapping as part of the boot operation of the plurality of boot operations; and determining the physical address of the LBA based on the mapping.

18. A non-transitory computer-readable medium storing code, the code comprising instructions executable by one or more processors to:

access a logical block address (LBA) of a plurality of LBAs as part of a boot operation of a plurality of boot operations;

increment a counter associated with the LBA based on accessing the LBA, wherein a quantity of accesses of the LBA is based on the counter;

receive an indication to perform a defragmentation process of a subset of the plurality of LBAs based on the quantity of accesses performed as part of the plurality of boot operations, wherein the subset of the plurality of LBAs comprises the LBA; and transfer, as part of the defragmentation process, one or more LBAs of the subset from one or more first blocks to one or more second blocks based on the indication.

19. The non-transitory computer-readable medium of claim 18, wherein the instructions are further executable by the one or more processors to:

determine, over the plurality of boot operations, that the quantity of accesses of the LBA satisfies a threshold, wherein receiving the indication is based on the quantity of accesses satisfying the threshold.

20. The non-transitory computer-readable medium of claim 18 wherein the instructions are further executable by the one or more processors to:

receive a second indication to reset the counter associated with the LBA; and set the counter to a first value based on receiving the second indication.

21. The non-transitory computer-readable medium of claim 20, wherein the instructions are further executable by the one or more processors to:

determine, over a second plurality of boot operations, a second quantity of accesses of the LBA as part of the second plurality of boot operations based on setting the counter to the first value.

22. The non-transitory computer-readable medium of claim 18, wherein the instructions are further executable by the one or more processors to:

generate a mapping between a logical address of the LBA and a physical address of the LBA based on transferring the one or more LBAs of the subset;

load the mapping as part of the boot operation of the plurality of boot operations; and determine the physical address of the LBA based on the mapping.

*   *   *   *   *